Feb. 4, 1936.  E. L. LORD  2,029,628
MEANS FOR CONTROLLING THE CHARGE AND DISCHARGE OF A STORAGE BATTERY
Filed March 28, 1932
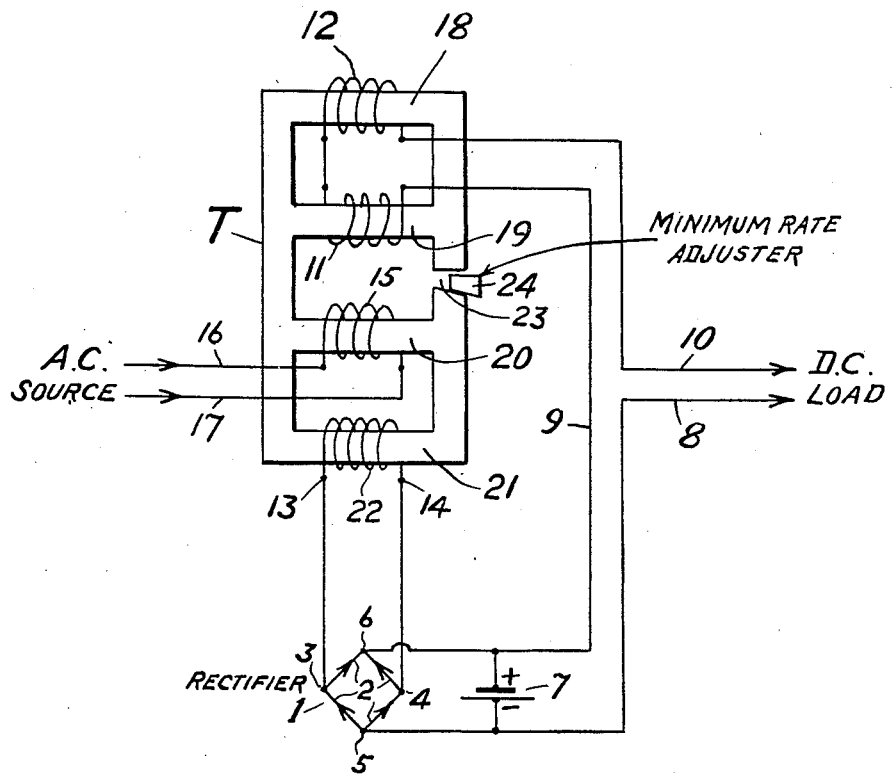
WITNESS:
INVENTOR
Edward L. Lord
BY
Augustus B. Stoughton
ATTORNEY.

Patented Feb. 4, 1936

2,029,628

UNITED STATES PATENT OFFICE 2,029,628

MEANS FOR CONTROLLING THE CHARGE AND DISCHARGE OF A STORAGE BATTERY

Edward L. Lord, Glenside, Pa., assignor to The Electric Storage Battery Company, Philadelphia, Pa., a corporation of Pennsylvania Application March 28, 1932, Serial No. 601,600

8 Claims. (Cl. 171—314)

The object of the invention is to provide a system including a storage battery connected to a load circuit and supplied with current from an A. C. source through a rectifier and to provide automatic means for varying the input from the A. C. source to the battery in accordance with the variations in load so that the greater part of these variations will be carried by the source and will not fall on the battery, the battery being supplied with a small amount of charging current sufficient to compensate for internal losses so long as the supply of current from the source is available, and the battery to be subject to discharge only when the supply of current from the source is interrupted.

In carrying out my invention, I provide a transformer between the A. C. source and the rectifier, this transformer being designed with an iron core having a magnetic shunt arranged to divert a portion of the magnetic flux developed in the primary winding so that only a portion of the total flux passes through the secondary winding. An exciting coil in series with the load is arranged on the magnetic shunt to produce a degree of saturation in this shunt varying with the load, thus varying the reluctance of the magnetic shunt path and thereby varying the amount of flux diverted from the secondary winding.

The invention will be more clearly understood by reference to the following description taken in conjunction with the accompanying drawing, which description and drawing illustrate one form my invention may take.

In the drawing, the numeral 1 represents a full wave rectifier of any well known type and design, here shown as consisting of four unilateral conducting devices 2 connected into a Wheatstone bridge of which the junction 3, 4 are connected to the secondary terminals 13, 14 of the transformer T, whose primary winding 15 is connected to the A. C. circuit 16, 17, while the other two junctions of the Wheatstone bridge 5, 6 are connected to the terminals of the storage battery 7. The battery is connected to the D. C. load circuit by conductor 8 on one side and conductors 9 and 10 on the other side. In series with conductors 9 and 10 are connected control coils 11 and 12 on transformer T.

Transformer T consists of four magnetic paths 18, 19, 20 and 21 connected in parallel. The two paths 20 and 21 constitute the main transformer on which are wound the primary winding 15 and the secondary winding 22 respectively. The other two paths 18 and 19 constitute magnetic shunts to the main paths 20 and 21. The magnetic flux in path 20 will be that required to develop in the winding 15 the necessary counter E. M. F. substantially to balance the applied E. M. F. In the absence of the shunt paths 18, 19, this entire flux would pass through the path 21, developing a corresponding voltage in the secondary winding 22, its value depending on the ratio of turns in the two windings. The flux shunted through paths 18 and 19 will reduce by a corresponding amount the flux passing through 21 and will, therefore, reduce the secondary voltage. The flux shunted through 18 and 19 will depend upon the magnetic reluctance of these paths and will be a maximum when these paths are unsaturated.

The control coils 11 and 12, which are in series with the D. C. load circuit produce in the paths 18 and 19 a certain degree of saturation when current is flowing in the load circuit, this saturation being approximately proportional to the load. This saturation, increasing with the D. C. load, reduces the amount of flux shunted from the secondary magnetic path 21, thereby increasing the flux in the latter and causing a corresponding increase in the secondary voltage. This increase in secondary voltage will increase the direct current delivered to the battery terminals through the rectifier 1. By properly designing the apparatus, the direct current delivered to the battery terminals can be made to increase or decrease by amounts corresponding to the increase or decrease in the load. Variations in load will thus fall on the source of A. C. current, and the battery will be relieved of these variations and will float across the circuit, receiving only the necessary charging current for compensating for internal losses.

It will be noted that the coils 11 and 12 are so wound as to cause a localized magnetic flux to pass through the magnetic paths 18 and 19 as a closed magnetic circuit. Also, the direction in which these two coils 11 and 12 are wound is such that the alternating flux shunted through them from the core 20 of the primary winding 15 will develop equal and opposite alternating voltages in the coils 11 and 12 which will neutralize each other and thus prevent the effect of the shunted alternating flux from being felt in the D. C. load circuit.

In order to adjust the voltage applied to the battery when there is no load on the D. C. circuit, I provide manual means for varying the reluctance of the magnetic shunt here shown as an air gap 23, whose reluctance is varied by inserting manually to a greater or less extent a block of magnetic material 24. Other well known means for varying the voltage applied to the rectifier by the secondary winding may of course be used.

I do not intend to be limited in the practice of my invention save as the scope of the prior art and of the attached claims may require.

I claim:

1. In combination, an A. C. supply circuit, a transformer having four parallel paths for magnetic flux, a primary winding connected to the A. C. circuit on one of said paths, a secondary winding on another of said paths, a rectifier connected to the secondary winding, a storage battery connected to receive unidirectional current from the rectifier, a D. C. load circuit connected to the battery, and two coils in series in the D. C. load circuit, one on each of the two remaining magnetic paths of the transformer and connected to assist each other in developing localized magnetic flux in said two last mentioned paths.

2. In combination, an A. C. supply circuit, a primary winding of a transformer connected to said A. C. circuit, a core of said transformer for conducting magnetic flux induced by said primary winding, a secondary winding on said core detached from said primary winding but adapted to receive induced current therefrom, a rectifier connected to said secondary winding, a battery connected to said rectifier to receive unidirectional current therefrom, a D. C. load circuit connected to said battery, and means connected in series with said D. C. circuit and said battery responsive to the load on said circuit and wound on said core for varying the magnetic flux passing from said primary winding to said secondary winding to thereby vary the amount of current fed by said secondary winding to said rectifier.

3. A combination according to claim 2 having means for adjusting the core for shunting from the secondary winding a part of the magnetic flux passing through the primary winding.

4. In combination, an A. C. supply circuit, a transformer having a magnetic core and having a primary winding connected to said supply circuit embracing one portion of said core and having a secondary winding disconnected from said primary winding embracing another portion of said core, a rectifier connected to said secondary winding, a D. C. circuit connected to said rectifier, means for shunting from the secondary winding a part of the magnetic flux passing through the primary winding, and means connected across said battery in series with the load on the D. C. circuit and responsive to the load on the D. C. circuit for varying the shunting effect of said shunting means without affecting the reluctance of the magnetic circuit embraced by the primary and secondary windings.

5. In combination, an A. C. supply circuit, a transformer having a magnetic core and having a primary winding connected to said supply circuit embracing one portion of said core and having a secondary winding disconnected from said primary winding embracing another portion of said core, a rectifier connected to said secondary winding, a D. C. circuit connected to said rectifier, means for shunting from the secondary winding a part of the magnetic flux passing through the primary winding, means connected across said battery in series with the load on the D. C. circuit and responsive to the load on the D. C. circuit for varying the shunting effect of said shunting means without affecting the reluctance of the magnetic circuit embraced by the primary and secondary windings, and other means independent of the load on the D. C. circuit for varying the shunting effect of said shunting means.

6. In combination, an A. C. supply circuit, a transformer, a primary winding on said transformer connected to the A. C. circuit, a secondary winding of the transformer detached from said primary winding but adapted to receive induced current therefrom, a rectifier connected to said secondary winding, a storage battery connected to receive unidirectional current from said rectifier, a D. C. load circuit connected to said battery, means for shunting from the secondary winding a part of the magnetic flux passing through the primary winding, and means connected across said battery in series with the load on the D. C. circuit and responsive to the load on the D. C. circuit for varying the shunting effect of said shunting means without affecting the reluctance of the magnetic circuit embraced by the primary and secondary windings.

7. In combination, a variable load, a storage battery connected with said load, a transformer having a primary and a secondary, a flux path for by-passing a portion of the flux of said transformer from said secondary, a rectifier having its input terminals connected with said secondary and its output terminals connected with said battery, and means effective when said load is increased for increasing the reluctance of said path to increase the charging current flowing into said battery.

8. In combination, a variable load, a storage battery connected with said load, a reactive transformer having a primary and a secondary, a rectifier having its input terminals connected with said secondary and its output terminals connected with said battery, and means connected across said battery in series with said load and effective when said load is increased for decreasing the leakage reactance of said transformer to increase the charging current flowing into said battery.

EDWARD L. LORD.